United States Patent
Murofushi

(10) Patent No.: US 10,417,467 B2
(45) Date of Patent: Sep. 17, 2019

(54) RADIO TAG READING APPARATUS AND CONTROL METHOD

(71) Applicant: TOSHIBA TEC KABUSHIKI KAISHA, Tokyo (JP)

(72) Inventor: Nobuo Murofushi, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/356,616

(22) Filed: Mar. 18, 2019

(65) Prior Publication Data

US 2019/0213367 A1 Jul. 11, 2019

Related U.S. Application Data

(62) Division of application No. 15/839,067, filed on Dec. 12, 2017, now Pat. No. 10,275,622.

(30) Foreign Application Priority Data

Dec. 20, 2016 (JP) .................. 2016-247048

(51) Int. Cl.
*G06K 7/10* (2006.01)
*G06K 7/00* (2006.01)
*G06K 19/077* (2006.01)

(52) U.S. Cl.
CPC ....... *G06K 7/10386* (2013.01); *G06K 7/0004* (2013.01); *G06K 7/10009* (2013.01); *G06K 7/10881* (2013.01); *G06K 19/0772* (2013.01)

(58) Field of Classification Search
CPC .......... G06K 7/10366; G06K 7/10009; G06K 19/0723; G06K 7/10316; G06K 7/10356; G06K 7/0008; G06K 19/0717; G06K 7/10257
USPC ........................................ 340/10.1
See application file for complete search history.

(56) References Cited

U.S. PATENT DOCUMENTS

| | | | |
|---|---|---|---|
| 7,597,250 B2 * | 10/2009 | Finn ................. | B60R 25/25 235/375 |
| 7,839,289 B2 * | 11/2010 | Chung ............... | G01S 5/0018 340/10.4 |
| 8,451,879 B2 * | 5/2013 | Kennedy ............ | H04B 1/71635 375/130 |
| 8,519,847 B2 * | 8/2013 | Honkanen ........... | G06K 7/0008 340/3.2 |
| 9,870,660 B1 * | 1/2018 | Patterson ........... | G07C 9/00111 |
| 2007/0206701 A1 * | 9/2007 | Paley .................. | G06K 7/0008 375/295 |
| 2007/0206705 A1 * | 9/2007 | Stewart ............... | G06K 7/0008 375/316 |
| 2007/0273484 A1 * | 11/2007 | Cederlof ............ | H04W 52/0225 340/10.33 |
| 2009/0146791 A1 * | 6/2009 | Jantunen .............. | G06K 7/0008 340/10.2 |
| 2009/0251292 A1 | 10/2009 | Suzuki | |

* cited by examiner

*Primary Examiner* — Mark S Blouin
(74) *Attorney, Agent, or Firm* — Kim & Stewart LLP

(57) ABSTRACT

In one embodiment, a radio tag reading apparatus has an antenna device, a storage device, and a controller. The controller judges what frequency band is usable or not out of a plurality of frequency bands stored in the storage device. Further the controller makes the antenna device radiate a radio wave in the judged usable frequency band at a transmission rate in accordance with a width of the judged usable frequency band.

10 Claims, 12 Drawing Sheets

RADIO TAG READING APPARATUS AND CONTROL METHOD

CROSS-REFERENCE TO RELATED APPLICATIONS

This application is a division of U.S. patent application Ser. No. 15/839,067, filed on Dec. 12, 2017, which is based upon and claims the benefit of priority from the prior Japanese Patent Application No. 2016-247048, filed on Dec. 20, 2016, the entire contents of each of which are incorporated herein by reference.

FIELD

Embodiments described herein relate generally to a radio tag reading apparatus and a control method thereof.

BACKGROUND

Recently, there exists a radio tag reading apparatus which reads information from a radio tag attached to a commodity, in a store such as a clothing store, using RFID (Radio Frequency Identification) technology, for example. This radio tag reading apparatus reads commodity information and so on from a radio tag attached to a commodity. For the reason, a store reads commodity information from radio tags attached to commodities displayed on a shelf or the like and commodities housed in a box, using the radio tag reading apparatus, to perform management of a stock status of the commodities in the store. In addition, the radio tag reading apparatus is also widespread in business worlds other than clothes.

An operator of a store trains a handy type radio tag reading apparatus on a radio tag attached to a commodity such as clothes displayed on a shelf, and radiates a radio wave for information reading from the radio tag reading apparatus, and receives a response radio wave from the radio tag, to receive information from the radio tag. And, when radiating the radio wave toward the radio tag, the radio tag reading apparatus performs carrier sense so as to avoid interference with a radio wave which is being radiated from another radio tag reading apparatus, and thereby executes radiation of the radio wave using an unused channel.

Incidentally, it takes a definite time for a radio tag reading apparatus to read information of a radio tag. For the reason, when the number of the radio tags to be read is large, it takes a great deal of time for reading information of all the radio tags.

DETAILED DESCRIPTION

Figure 1:
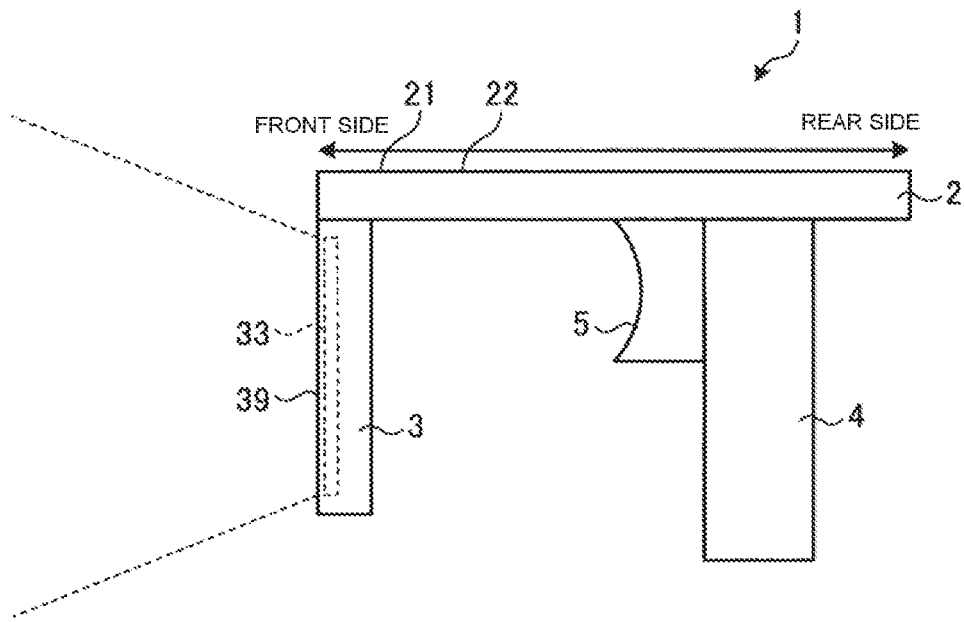
FIG. 1 is a side view showing an outer appearance of a radio tag reading apparatus according to an embodiment.

According to one embodiment, the radio tag reading apparatus radiates a radio wave to a radio tag, to receive information of the radio tag. The radio tag reading apparatus has an antenna device, a storage device, and a controller. The antenna device radiates the radio wave toward the radio tag and receives a response radio wave from the radio tag. The storage device stores a plurality of frequency bands sorted into frequency bands in which the radio wave can be radiated. The controller has a processor and a memory, and as a result that the processor executes a program stored in the memory, judges what frequency band is usable or not out of the plurality of frequency bands stored in the storage device. The controller makes the antenna device radiate the radio wave in the judged usable frequency band at a transmission rate in accordance with a width of the judged usable frequency band, to execute communication with the radio tag.

First Embodiment

Hereinafter, a radio tag reading apparatus of a first embodiment and a control method thereof will be described in detail with reference to FIG. 1 to FIG. 8. In the drawings, the same symbols indicate the same or similar portions. Further, in the first embodiment described below, the radio tag reading apparatus will be described using a handy type radio tag reading apparatus. In addition, in the first embodiment, an example of an apparel shop for selling clothes will be described as an example of a store, but the store may be a store for selling other commodities. The radio tag reading apparatus described below is not limited to the embodiment.

FIG. 1 is a side view of a radio tag reading apparatus 1 according to the first embodiment which is seen from a side surface thereof. The radio tag reading apparatus 1 radiates a radio wave to a radio tag ST (refer to FIG. 6) attached to a commodity, and receives information of the commodity from each radio tag, to collect the information of the commodity. In addition, the radio tag reading apparatus 1 radiates a radio wave including information of a commodity to a radio tag attached to the commodity, to write the information of the commodity into the radio tag ST.

As shown in FIG. 1, the radio tag reading apparatus 1 has a main body 2, an antenna device 3, a grip 4 and a trigger switch 5. The antenna device 3 is arranged at a front side in the radiation direction of the radio wave in the main body 2. When the radio tag reading apparatus 1 is operated, the grip 4 is gripped by an operator. The grip 4 is arranged behind the antenna device 3 in the main body 2. The antenna device 3 has a plane portion 39 at a foremost portion thereof. In addition, the antenna device 3 incorporates an antenna 33 formed in a plane shape of a substantially square shape therein. The antenna 33 is provided in approximately parallel with the plane portion 39.

The trigger switch 5 is incorporated in the grip 4. The trigger switch 5 is a switch for radiating/stopping a radio wave from the antenna 3. When an operator pulls and operates the trigger switch 5 while gripping the grip 4, the radio tag reading apparatus 1 radiates a radio wave from the antenna device 3 (the antenna 33). The radio tag ST receives the radio wave radiated from the antenna device 3 of the radio tag reading apparatus 1, and transmits a response wave. The response wave includes information of a commodity to which the radio tag ST is attached. In addition, the radio tag reading apparatus 1 receives the response wave from the radio tag ST by the antenna 33 of the antenna device 3. When the operator releases the operation of the trigger switch 5, the radio tag reading apparatus 1 stops radiating the radio wave from the antenna device 3. In addition, the radio tag reading apparatus 1 has an operation unit 22 for performing various operations and a display unit 21 for performing various displays on upper portions thereof.

Figure 2:
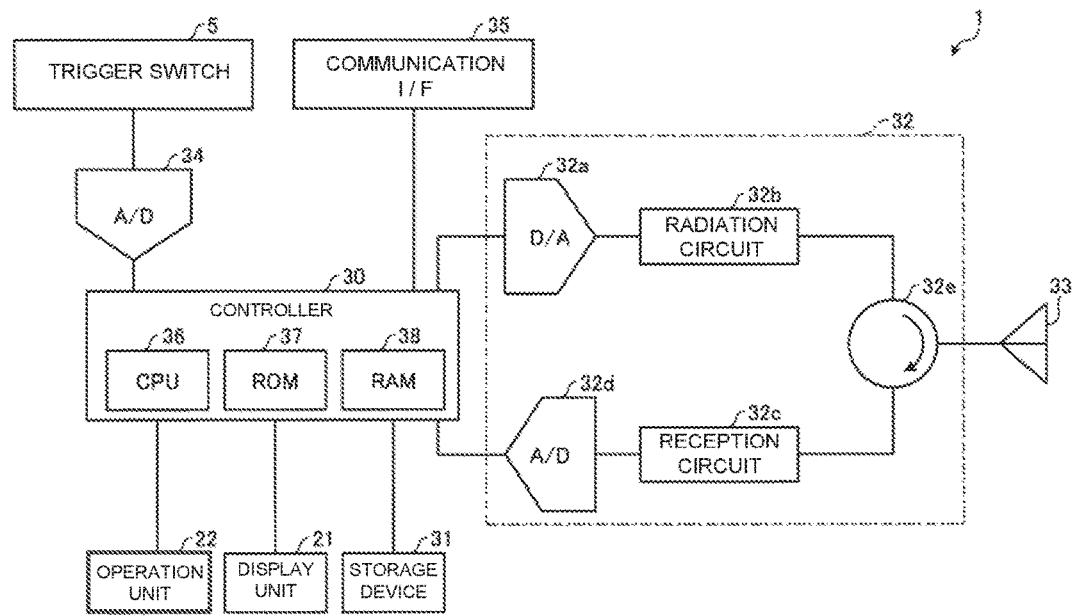
FIG. 2 is a block diagram showing a hardware configuration of the radio tag reading apparatus according to the embodiment.

Next, a circuit configuration of the radio tag reading apparatus 1 will be described using FIG. 2. A controller 30 for main control is mounted on the main body 2. The controller 30 has a processor including a CPU (Central Processing Unit) 36 which functions as a control subject, a ROM (Read Only Memory) 37 which mainly stores a program, and a RAM (Random Access Memory) 38 which temporarily stores various data and so on.

The CPU 36 operates in accordance with a control program which has been stored in the ROM 37 or a storage device 31 and has been developed in the RAM 38, and thereby the controller 30 executes a control processing described later. The display unit 21, the operation unit 22, the storage device 31 including a HDD (Hard Disc Drive) or a nonvolatile memory such as a flash memory, a radio unit 32, a communication I/F 35 are connected to this controller 30. In addition, an A/D converter 34 for A/D converting an output (an analog value) of the trigger switch 5 is also connected to the controller 30. When an ON signal generated as a result that the trigger switch 5 has been operated is inputted to the controller 30, the controller 30 makes the antenna 30 radiate a radio wave for collecting information stored in the radio tag ST. In addition, though not shown in the drawing, the radio tag reading apparatus 1 incorporates a battery for driving the respective circuits.

The storage device 31 includes the hard disc drive or the nonvolatile memory such as a flash memory, and stores the control program and input data. In addition, though the storage device 31 will be described later in detail, it stores vacant (usable) channels and frequency bands in association.

The radio unit 32 has a D/A converter 32a, a radiation circuit 32b, a reception circuit 32c, an A/D converter 32d, a transmission/reception switch 32e. The D/A converter 32a performs D/A conversion of radiation data and control data from the controller 30 by separate systems, and supplies the D/A converted data to the radiation circuit 32b.

The radiation circuit 32b performs prescribed modulation and output power adjustment of the inputted radiation data, and outputs a modulated signal to the antenna 33 via the transmission/reception switch 32e for switching between radiation and reception. On the other hand, a response signal (a response radio wave) from the radio tag ST which has been received by the antenna 33 is supplied to the reception circuit 32c via the transmission/reception switch 32e. And the reception circuit 32c demodulates the response signal. The demodulated response signal is A/D converted by the A/D converter 32d and is supplied to the controller 30.

The communication I/F 35 transmits information to a store server (not shown), and receives information from the store server, using radio communication. The store server manages sales information and stock information of commodities.

Next, the relation between a vacant channel and a frequency band to be used which have been stored in the storage device 31. In the first embodiment, the radio tag reading apparatus 1 radiates radio waves using three channels of A1, A2, A3. Frequency bands of radio waves which the radio tag reading apparatus 1 radiates are set for the respective channels.

Figure 3:
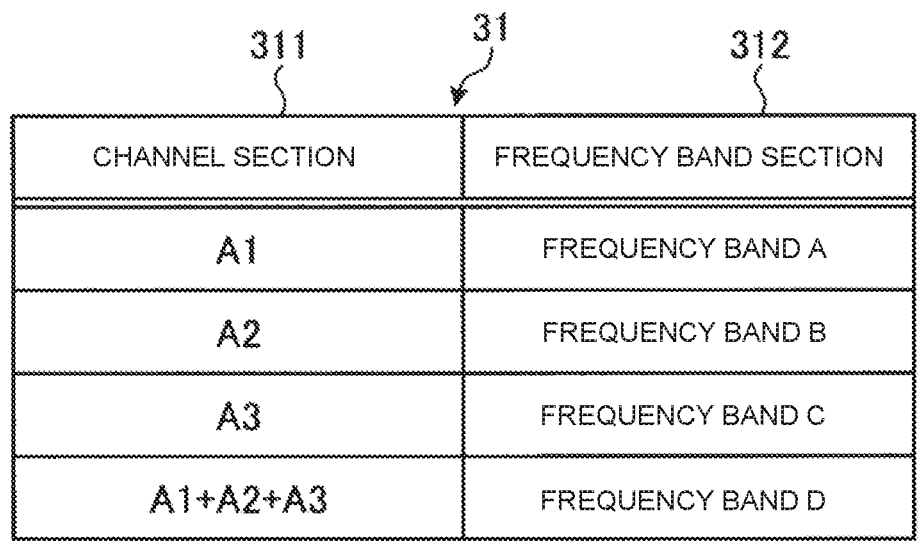
FIG. 3 is a diagram showing a memory map of the storage device according to the embodiment.

FIG. 3 shows the relation between a vacant channel and a frequency band to be used in a memory map stored in the storage device 31. The storage device 31 has a channel section 311 and a frequency band section 312. The channel section 311 stores a kind of a channel which the radio tag reading apparatus 1 can use (which is not used by another radio tag reading apparatus 1, and is vacant). The frequency band section 312 stores a frequency band to be used corresponding to the channel stored in the channel section 311.

In the case of the first embodiment, when a vacant channel is the channel A1, the radio tag reading apparatus 1 radiates a radio wave set in a frequency band A (a second frequency band). In this case, a transmission rate of the radio wave which the radio tag reading apparatus 1 radiates is a low speed (a second transmission rate). In addition, when a vacant channel is the channel A2, the radio tag reading apparatus 1 radiates a radio wave set in a frequency band B (the second frequency band). In this case, a transmission rate of the radio wave which the radio tag reading apparatus 1 radiates is the low speed (the second transmission rate). In addition, when a vacant channel is the channel A3, the radio tag reading apparatus 1 radiates a radio wave set in a frequency band C (the second frequency band). In this case, a transmission rate of the radio wave which the radio tag reading apparatus 1 radiates is the low speed (the second transmission rate).

In addition, when vacant channels are the channels A1 and A2, the radio tag reading apparatus 1 radiates a radio wave in any one frequency band of the frequency band A and the frequency band B. In this case, a transmission rate of the radio wave which the radio tag reading apparatus 1 radiates is the low speed (the second transmission rate). In addition, when vacant channels are the channels A2 and A3, the radio tag reading apparatus 1 radiates a radio wave in any one frequency band of the frequency band B and the frequency band C. In this case, a transmission rate of the radio wave which the radio tag reading apparatus 1 radiates is the low speed (the second transmission rate).

When vacant channels are the channels A1, A2, A3, the radio tag reading apparatus 1 radiates a radio wave in a frequency band D (a first frequency band) that is the frequency band A+the frequency band B+the frequency band C. In this case, in accordance with publicly-known Shannon-Hartley theorem, a frequency band of the frequency band D is wider than the frequency band A, the frequency band B, and the frequency band C. For the reason, a transmission rate of the radio wave can be set to a high speed. Accordingly, a transmission rate of the radio wave which the radio tag reading apparatus 1 radiates is a high speed (a first transmission rate).

Here, a width of a frequency band of a radio wave which the radio tag reading apparatus 1 radiates and a transmission rate of the radio wave which can be set. For a radio wave in a frequency band which has been widen, a transmission rate of the radio wave can be set faster. For a radio wave in a frequency band which has been narrowed, only a slow transmission rate can be set.

Figure 4:
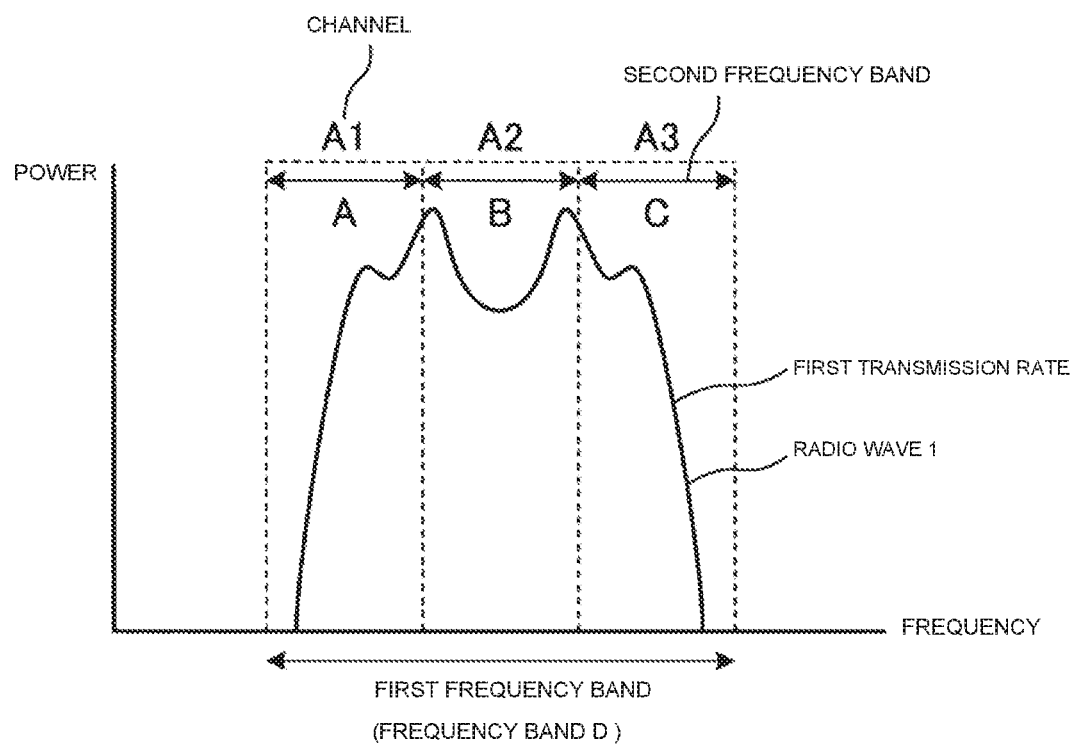
FIG. 4 is a diagram showing the relation between a frequency band of a radio wave which the radio tag reading apparatus according to the embodiment transmits using all the frequency bands and a power thereof.

Next, a usable frequency band and a power will be described. FIG. 4 is a diagram showing the relation between a frequency band of a radio wave which the radio tag reading apparatus 1 transmits and a power thereof, when all the channels are vacant (usable). As shown in FIG. 4, when the channel A1, the channel A2, and the channel A3 are all vacant, for example, the radio tag reading apparatus 1 transmits a radio wave 1 using the frequency band D (the first frequency band) including all the channels. This radio wave 1 is transmitted at the first transmission rate with a fast transmission rate.

Figure 5:
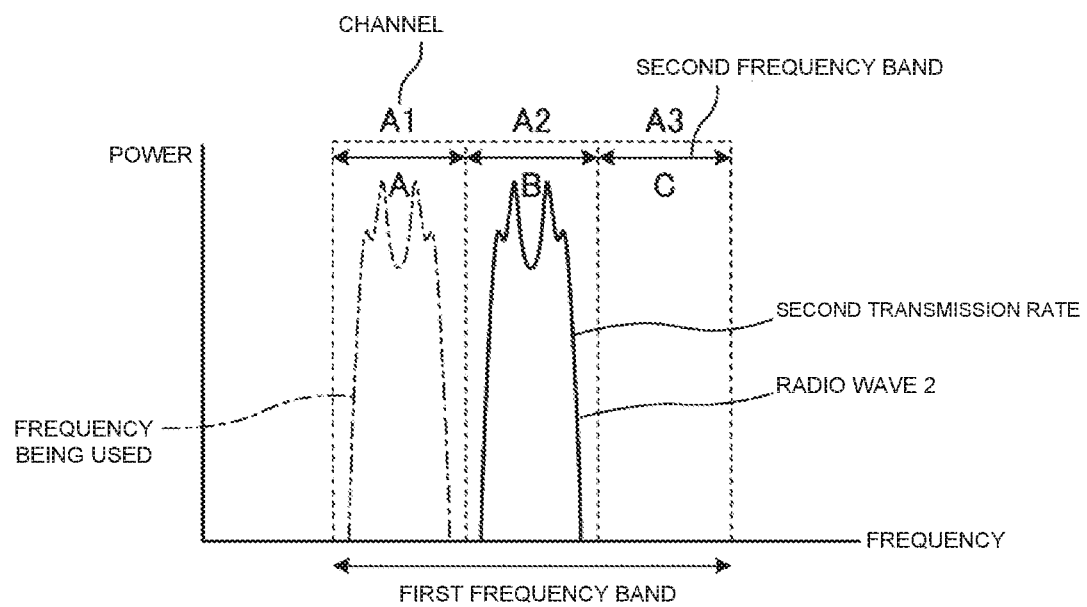
FIG. 5 is a diagram showing the relation between a frequency band of a radio wave which the radio tag reading apparatus according to the embodiment transmits using one of the vacant frequency bands and a power thereof.

Next, a case in which any one of the channel A1, the channel A2, the channel A3 is used will be described using FIG. 5. In the example of FIG. 5, the channel A1 is a frequency band which is being used (a waveform of a dashed line). For the reason, the radio tag reading apparatus 1 transmits a radio wave (a waveform of a solid line) using the frequency band B corresponding to the vacant channel A2. This radio wave 2 is transmitted at the second transmission rate with a slow transmission rate. In addition, the radio tag reading apparatus 1 may transmit the radio wave 2 in the frequency band C, using the vacant channel A3.

Figure 6:
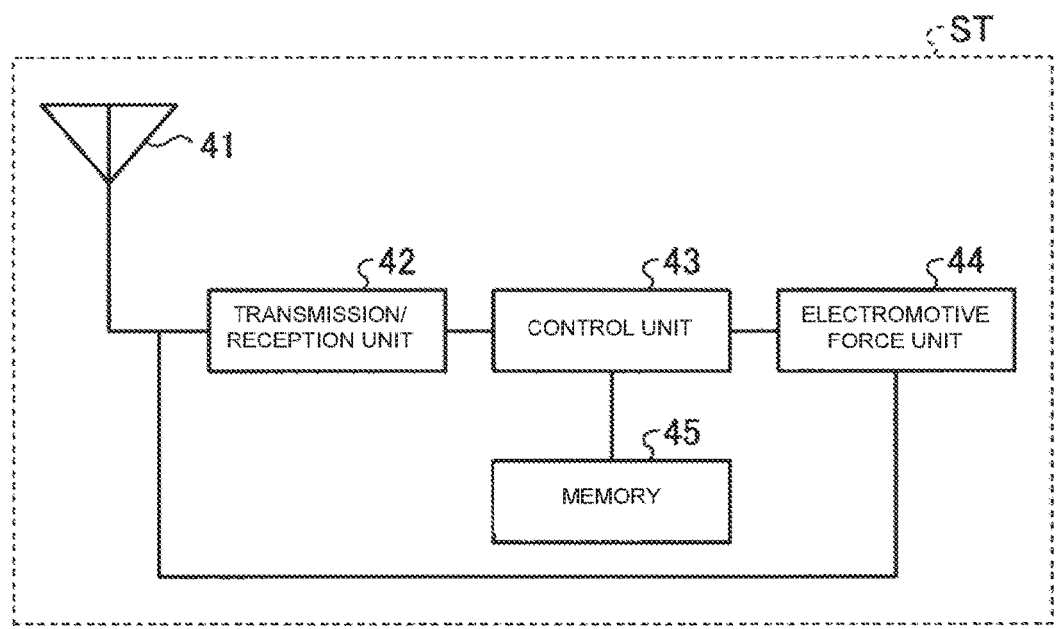
FIG. 6 is a block diagram showing a hardware configuration of a radio tag according to the embodiment.

Next, the radio tag ST will be described using FIG. 6. The radio tag ST has an antenna 41, a transmission/reception unit 42, a control unit 43, an electromotive force unit 44, a memory 45. The control unit 43 controls the transmission/reception unit 42, the electromotive force unit 44, and memory 45. The antenna 41 receives the radio wave radiated from the antenna 33 of the radio tag reading apparatus 1. The transmission/reception unit 42 controls transmission/reception of the radio wave by the antenna 41. The electromotive force unit 44 generates power for starting up the radio tag ST, and for performing control such as transmitting information to the radio tag reading apparatus 1, based on the radio wave from the radio tag reading apparatus 1 which has been received by the antenna 41. The memory 45 stores commodity information of a commodity S to which the radio tag ST is attached, and radio tag information for identifying the relevant radio tag ST.

Figure 7:
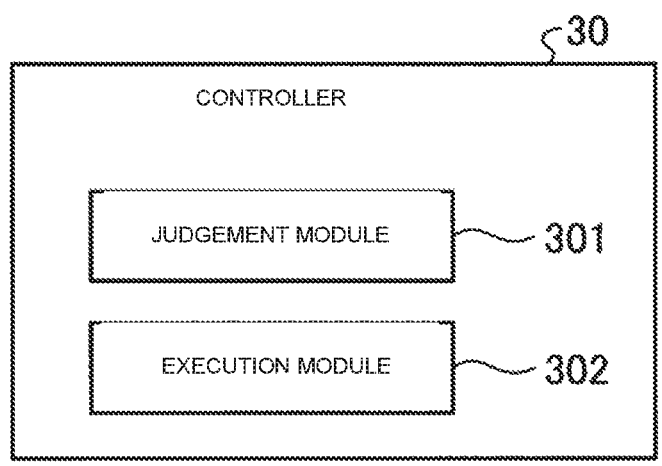
FIG. 7 is a block diagram showing a functional configuration of the radio tag reading apparatus according to the embodiment.

Subsequently, a control processing of the radio tag reading apparatus 1 according to the first embodiment will be described using FIG. 7, FIG. 8. FIG. 7 is a functional block diagram showing a functional configuration of the radio tag reading apparatus 1. The CPU 36 operates in accordance with the various programs including the control program stored in the ROM 37 and so on, and thereby the controller 30 functions as a judgement module 301, an execution module 302.

The judgement module 301 has a function to judge a use state of another radio tag reading apparatus which reads information of a radio tag in a frequency band in which the radio wave can be radiated, and to judge a usable frequency band.

The execution module 302 has a function to perform communication with the radio tag at a transmission rate in accordance with a width of the usable frequency band which has been judged by the judgement module 301.

Figure 8:
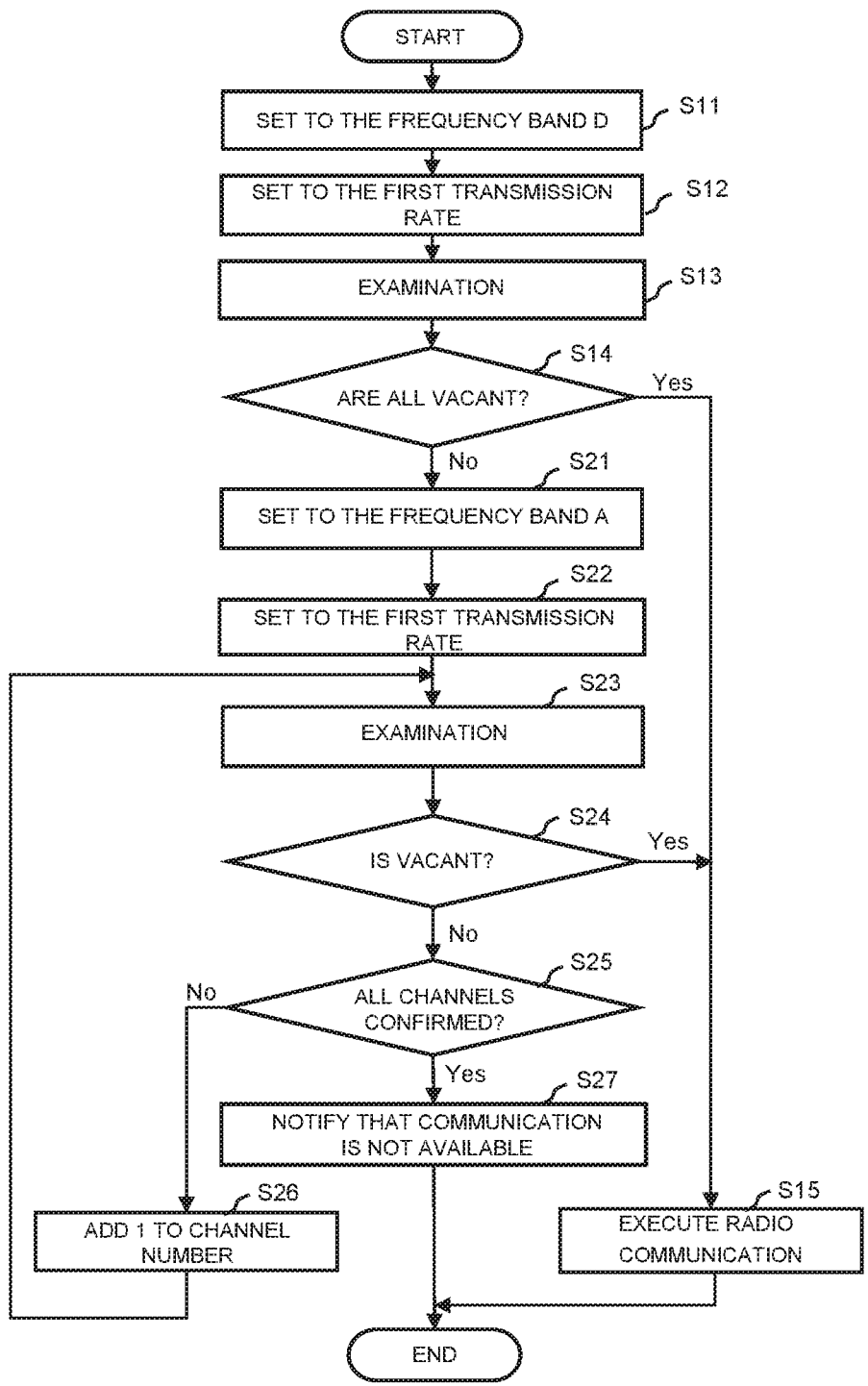
FIG. 8 is a flow chart showing a control processing of a radio tag reading apparatus according to a first embodiment.

FIG. 8 is a flow chart showing a control processing of the radio tag reading apparatus 1 in the first embodiment. As shown in FIG. 8, in a step S11, the controller 30 sets a frequency band of a radio wave to be radiated (hereinafter simply called a frequency band thereof) to the frequency band D that is the first frequency band. Next, in a step S12, the controller 30 sets a transmission rate of the radio wave to be radiated to the high speed (the first transmission rate). And, in a step S13, the controller 30 examines (carrier senses) whether or not a frequency band which has been used already is present in the frequency band D. Specifically, the controller 30 examines whether or not interference with a radio wave (hereinafter called another radio wave) radiated from another radio tag reading apparatus 1 is generated, before radiating the radio wave in the frequency band D. This examination method is performed by a previously known method.

Next, in a step S14, the controller 30 (the judgment module 301) judges whether or not all the frequency bands in the frequency band D are vacant, that is, whether or not all the channels are usable. When judging that the interference with the another radio wave is not generated in the frequency band D, as a result of the above-described examination, the controller 30 judges that all the channels are vacant (usable). When judging that the interference with the another radio wave is generated in the frequency band D, the controller 30 judges that all the channels are not vacant (a part of the channels is already used). When it is judged by the controller 30 (the judgment module 301) that all the channels are vacant (Yes in step S14) the processing of the controller 30 transfers to a step S15. In the step S15, the controller (the execution module 302) radiates the radio wave 1 at the high speed in the frequency band D, to execute radio communication with the radio tag ST. In the processing of this step S15, the controller 30 receives information (commodity information, for example) from the radio tag ST. And the controller 30 finishes the processing.

On the other hand, when it is judged by the controller 30 that all the channels are not vacant (No in step S14), the processing of the controller 30 transfer to a step S21. In the step S21, the controller 30 sets a frequency band thereof to the frequency band A of the channel A1. Next, in a step S22, the controller 30 sets a transmission rate of a radio wave to be radiated to the low speed (the second transmission rate). And, in a step S23, the controller 30 examines whether or not the frequency band A is used already. This examination is the same examination as the step S13.

And, in a step S24, the controller 30 (the judgment module 301) judges whether or not the channel A1 is vacant. When it is judged by the controller 30 that the channel A1 is vacant (Yes in step S24), the processing of the controller 30 transfers to the step S15. In the step S15, the controller 30 radiates the radio wave 2 at the low speed in the frequency band A, to execute radio communication with the radio tag ST. In the processing of this step S15, the controller 30 receives information (commodity information, for example) from the radio tag ST. And the controller 30 finishes the processing.

In addition, when it is judged by the controller 30 that the channel A1 is not vacant (is used already) (No in step S24), the processing of the controller 30 transfers to a step S25. In the step S25, the controller 30 judges whether or not use states in all the channels of the channel A1, the channel A2, and the channel A3 have been confirmed. The controller 30 stores the channel set in the step S21 and the channel judged in the step S24, to execute the judgment of the step S25. When it is judged by the controller that all the channels have not been confirmed yet (No in step S25), the processing of the controller 30 transfers to a step S26. In the step S26, the controller 30 designates and sets the next channel. And the processing of the controller 30 returns to the step S23, and the controller 30 executes the examination. And the controller 30 repeats the judgment processings of the step S24 and the step S25. In this case, in the processing of each of the steps S15, the radio wave is radiated at the low speed in the above-described set frequency band.

On the other hand, when it is judged by the controller 30 that the use states in all the channels have been judged in the step S25 (Yes in step S25), the processing of the controller 30 transfers to a step S27. Since all the channels are already in the use states, in the step S27, the controller 30 displays a message indicating that communication with the radio tag ST is not available on the display unit 21. And the controller 30 finishes the processing.

According to the first embodiment like this, when all the channels (frequency bands) are vacant (usable), the controller 30 sets a transmission rate of a radio wave to the high speed and radiates the radio wave, to collect information from the radio tag. For the reason, even when the number of the radio tags to be read is large, it is possible to shorten a read time of the radio tag. In addition, the first embodiment is effective when the number of the radio tag reading apparatuses 1 to be used simultaneously is relatively small (the interference is not relatively generated).

Second Embodiment

From here on, a second embodiment will be described. In the first embodiment, the radio tag reading apparatus 1 has firstly examined a use state of a radio wave by another radio tag reading apparatus 1 using the frequency band D. In contrast, in the second embodiment, the radio tag reading apparatus 1 firstly examines the frequency band A of the channel A1, the frequency band B of the channel A2, the frequency band C of the channel A3 individually, and if the channel A1, the channel A2, the channel A3 are all usable, the radio tag reading apparatus 1 sets a frequency band thereof to the frequency band D assuming that all the channels are vacant.

Figure 9:
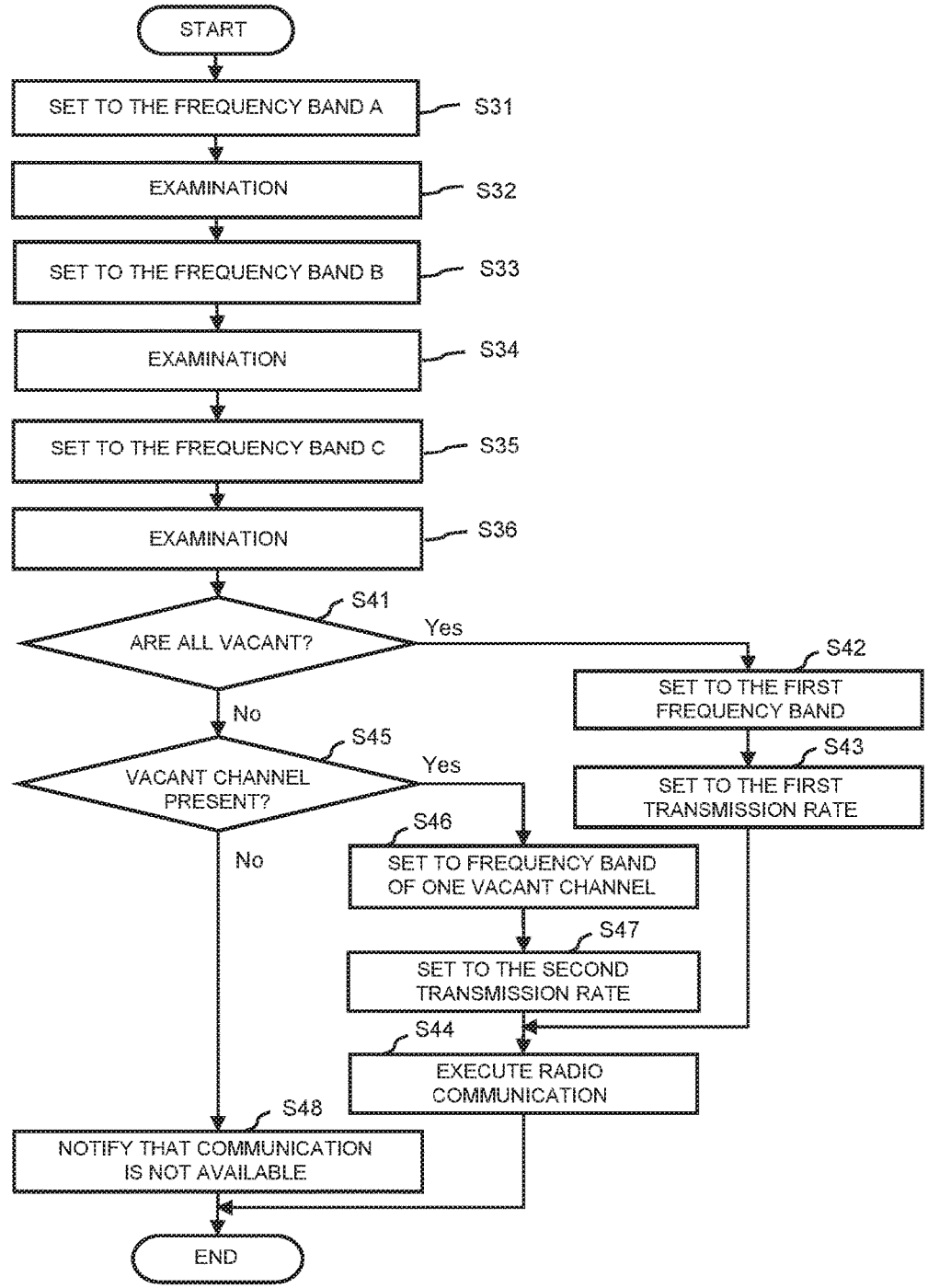
FIG. 9 is a flow chart showing a part of a control processing of a radio tag reading apparatus according to a second embodiment.

FIG. 9 is a flow chart showing a control processing of the radio tag reading apparatus 1 in the second embodiment. As shown in FIG. 9, in a step S31, the controller 30 firstly sets a frequency band thereof to the frequency band A that is the frequency band of the channel A1. And in a step S32, the controller 30 examines whether or not the channel A1 is already used based on whether or not the radio wave interference is generated. This examination is the same examination as the step S13. Similarly, in a step S33, the controller 30 sets a frequency band thereof to the frequency band B that is the frequency band of the channel A2. And in a step S34, the controller 30 examines whether or not the channel A2 is already used. This examination is the same examination as the step S13. Similarly, in a step S35, the controller 30 sets a frequency band thereof to the frequency band C that is the frequency band of the channel A3. And in a step S36, the controller 30 examines whether or not the channel A3 is already used. This examination is the same examination as the step S13.

Next, in a step S41, the controller 30 (the judgment module 301) judges whether or not all the channels are vacant (usable), based on the examinations of the step S32, the step S34, the step S36. As a result of the examinations of the step S32, the step S34, the step S36, when the interference with another radio wave is not generated in any of the channels, the controller 30 judges that all the channels are vacant. As a result of the examinations of the step S32, the step S34, the step S36, when the interference with another radio wave is generated in any of the channels, the controller 30 judges that all the channels are not vacant.

When it is judged by the controller 30 that all the channels are vacant (Yes in step S41), in a step S42, the controller 30 sets a frequency band thereof to the frequency band D. And, in a step S43, the controller 30 sets a transmission rate of a radio wave to be radiated to the high speed (the first transmission rate). And, in a step S44, the controller 30 (the execution module 302) radiates the radio wave 1 at the high speed in the frequency band D, to execute radio communication with the radio tag ST. And the controller 30 finishes the processing.

On the other hand, when it is judged by the controller 30 that all the channels are not vacant (No in step S41), the processing of the controller 30 transfers to a step S45. In the step S45 the controller 30 (the judgment module 301) judges whether or not a vacant channel is present. As a result of the examinations of the step S32, the step S34, the step S36, when a channel in which the interference with another radio wave is not generated is present, the controller 30 judges that a vacant channel is present. As a result of the examinations of the step S32, the step S34, the step S36, when the interference with another radio wave is generated in all the channels, the controller 30 judges that a vacant channel is not present.

When it is judged by the controller 30 that a vacant channel is present (Yes in step S45), the processing of the controller 30 transfers to a step S46. In the step S46, the controller 30 sets a frequency band thereof to the frequency band corresponding to the one vacant channel. And in a step S47, the controller 30 sets a transmission rate of a radio wave to be radiated to the low speed (the second transmission rate). And, in the step S44, the controller 30 radiates the radio wave 2 at the low speed in the set frequency band, to execute radio communication with the radio tag ST. And the controller 30 finishes the processing.

In addition, in the step S45, when it is judged that (No in step S45), the processing of the controller 30 transfers to a step S48. In the step S48, the controller 30 displays a message indicating that communication with the radio tag ST is not available on the display unit 21. And the controller 30 finishes the processing.

According to the second embodiment like this, when all the channels (frequency bands) are vacant (usable), the controller 30 sets a transmission rate of a radio wave to the high speed and radiates the radio wave, to collect information from the radio tag. For the reason, even when the number of the radio tags to be read is large, it is possible to shorten a read time of the radio tag. In addition, the second embodiment is effective when the number of the radio tag reading apparatuses to be used simultaneously is relatively large (the interference is relatively easily generated).

Third Embodiment

Figure 11:
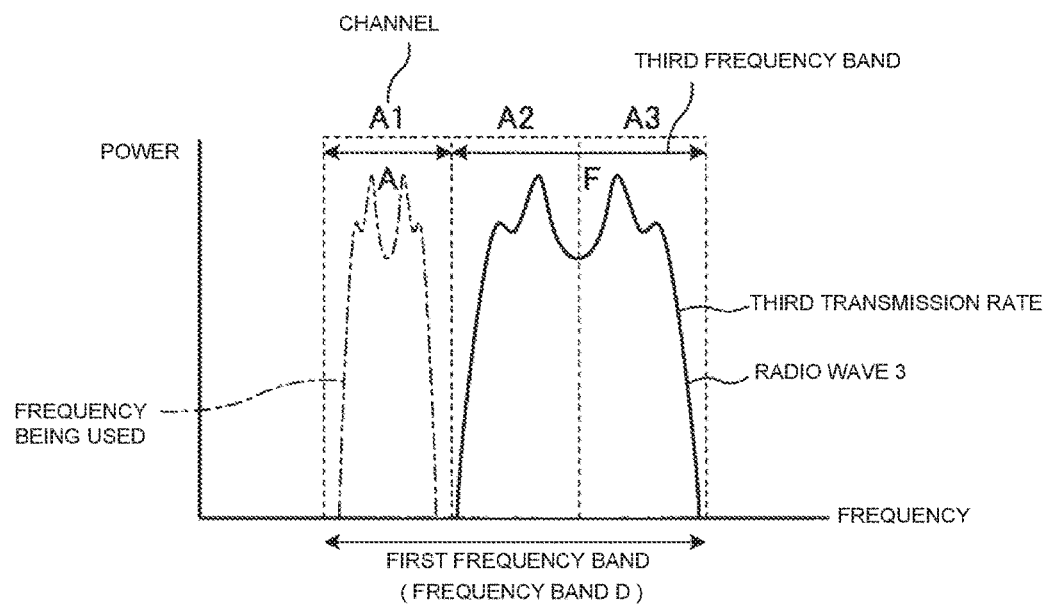
FIG. 11 is a diagram showing the relation between another frequency band of a radio wave which the radio tag reading apparatus according to the third embodiment transmits and a power thereof.
Figure 12:
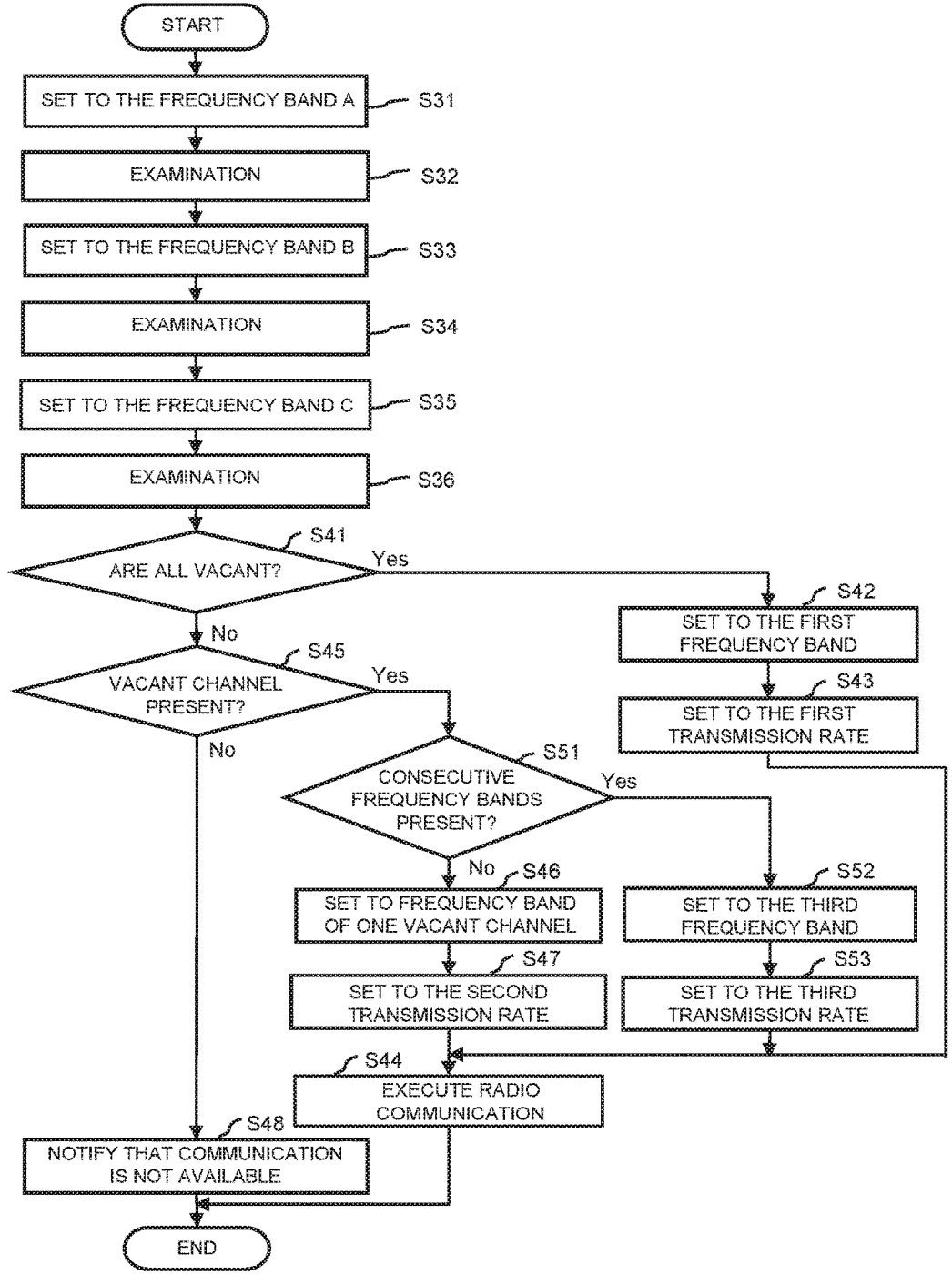
FIG. 12 is a flow chart showing a part of a control processing of a radio tag reading apparatus according to the third embodiment.

From here on, a third embodiment will be described using FIG. 10-FIG. 12. In the first embodiment and the second embodiment, when the interference with a radio wave is generated, the radio tag reading apparatus 1 has radiated the radio wave 2 of the transmission rate of the low speed. In the third embodiment, when the interference with the radio wave is generated, the radio tag reading apparatus 1 further examines whether or not consecutive vacant channels are present, and when the consecutive vacant channels are present, the radio tag reading apparatus 1 sets a frequency band thereof to the consecutive frequency bands using the consecutive channels. In addition, the radio tag reading apparatus 1 sets a transmission rate of a radio wave to a medium speed (a third transmission rate) that is a speed slower than the high speed and faster than the low speed.

Figure 10:
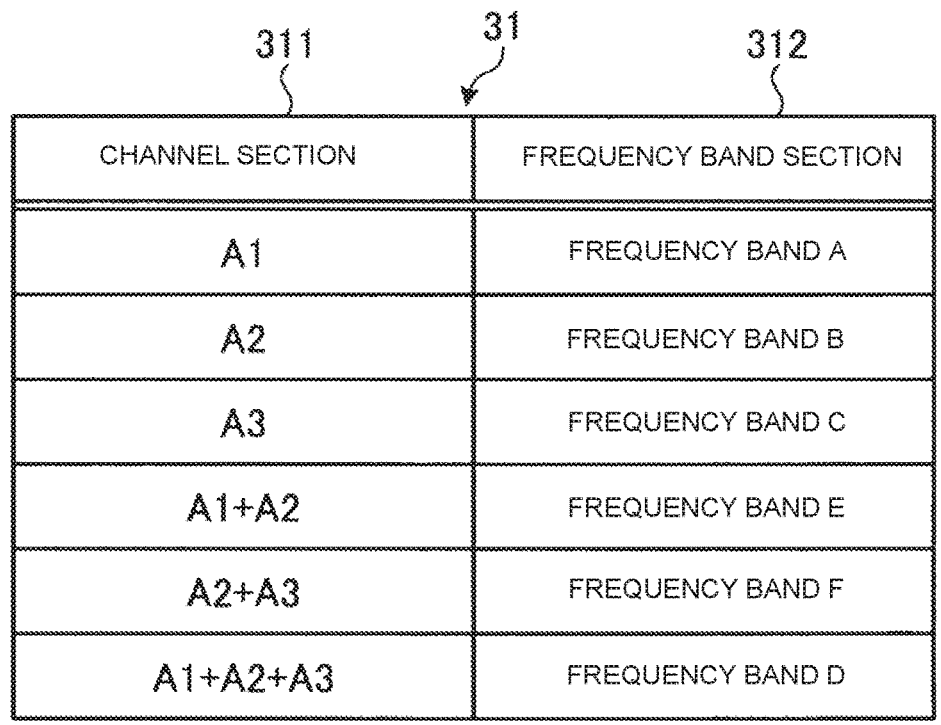
FIG. 10 is a diagram showing a memory map of a storage device according to a third embodiment.

FIG. 10 shows the relation between a vacant channel and a frequency band to be used in a memory map stored in the storage device 31 according to the third embodiment. In FIG. 10, the same symbols are given to the same portions shown in FIG. 3, and the description thereof will be simplified or omitted.

In the third embodiment, when a vacant channel is A1, or a vacant channel is A2, or a vacant channel is A3, the radio tag reading apparatus 1 radiates a radio wave in a frequency band corresponding to the relevant vacant channel. In this case, a transmission rate of the radio wave which the radio tag reading apparatus 1 radiates is the low speed (the second transmission rate).

In addition, when vacant channels are the consecutive channels A1 and A2, the radio tag reading apparatus 1 radiates a radio wave in a consecutive frequency band E obtained by combining the frequency band A and the frequency band B. In this case, a frequency band of the frequency band E is wider than the frequency band A, the frequency band B, the frequency band C. However, a frequency band of the frequency band E is narrower than a frequency band of the frequency band D. For the reason, it is possible to set a transmission rate of the radio wave to the medium speed that is faster than the low speed and slower than the high speed. Accordingly, a transmission rate of the radio wave which the radio tag reading apparatus 1 radiates is the medium speed (the third transmission rate). In addition, when vacant channels are A2 and A3, the radio tag reading apparatus 1 radiates a radio wave in a consecutive frequency band F obtained by combining the frequency band B and the frequency band C. Also in this case, a transmission rate of the radio wave which the radio tag reading apparatus 1 radiates is the medium speed (the third transmission rate).

Next, a case in which one channel is used and consecutive two channels are vacant will be described using FIG. 11. In the example of FIG. 11, the channel A1 is used (a waveform of a dashed line). For the reason, the radio tag reading apparatus 1 transmits a radio wave 3 (a waveform of a solid line) using the consecutive frequency band F corresponding to the vacant channels A2 and A3. This radio wave 3 is transmitted at a transmission rate of the medium speed (the third transmission rate).

Next, a control of the radio tag reading apparatus 1 according to the third embodiment will be described. FIG. 12 is a flow chart showing a part of a control processing of the radio tag reading apparatus 1. In FIG. 12, since the steps S31-S36, the steps S41-S45, and the step S48 perform the same control processings as FIG. 9, the description thereof will be omitted.

In addition, in the step S45, when it is judged by the controller 30 that a vacant channel is present (Yes in step S45), the processing of the controller 30 transfers to a step S51. In the step S51, the controller 30 (the judgment module 301) judges whether or not two or more vacant channels with consecutive frequency bands are present. When it is judged by the controller 30 that two or more consecutive vacant channels are present (Yes in step S51), the processing of the controller 30 transfers to a step S52. In the step S52, the controller 30 sets a frequency band thereof to a third frequency band corresponding to the consecutive channels. And in a step S53, the controller 30 sets a transmission rate of the radio wave to the transmission rate of the medium speed. And, in the step S44, the controller 30 (the execution module 302) radiates the radio wave 3 at the medium speed in the set frequency band, to execute radio communication with the radio tag ST. And the controller 30 finishes the processing.

In addition, when it is judged by the controller 30 that two or more consecutive vacant channels are not present (No in step S51), the controller 30 executes the processings of the step S46 and the step S47. The processings of the step S46 and the step S47 are the same processings as the step S46 and the step S47 of the second embodiment.

According to the third embodiment like this, when all the channels (frequency bands) are vacant (usable), the controller 30 sets a transmission rate of a radio wave to the high speed and radiates the radio wave, to collect information from the radio tag. For the reason, even when the number of the radio tags to be read is large, it is possible to shorten a read time of the radio tag. In addition, the third embodiment is effective when the number of the radio tag reading apparatuses 1 to be used simultaneously is relatively large (the interference is relatively easily generated).

In addition, according to the third embodiment, when a plurality of consecutive channels are vacant, the controller 30 sets a transmission rate of a radio wave to the third transmission rate that is slower than the first transmission rate and faster than the second transmission rate. For the reason, even when the number of the radio tags to be read is large, it is possible to make a read time of the radio tag relatively short.

For example, in the embodiments, three channels have been used, but any number of channels may be used if the number of the channels is not less than 2.

In addition, in the embodiments, three kinds of rates of the first transmission rate, the second transmission rate, and the third transmission rate have been used, but any number of kinds of rates may be used if the number of the rates is not less than 2.

In addition, in the embodiments, the radio tag reading apparatus 1 to be used in an apparel shop for selling clothes has been described, but without being limited to this, the embodiments may be applied to the radio tag reading apparatus 1 to be used in a store, a warehouse or the like where a radio tag can be used.

In addition, in the third embodiment (the flow chart of FIG. 12), the same control processing as the second embodiment (the flow chart of FIG. 9) has been executed, but the same control processing as the first embodiment (the flow chart of FIG. 8) may be executed.

In this case, after the step S24 (Yes in step S24), the judgment processing of the step S51 and the processings of the steps S46, S47, S52, S53 have only to be executed.

In addition, the program to be executed in the radio tag reading apparatus 1 of the embodiments is provided while being recorded in a computer readable recording medium, such as a CD-ROM, a flexible disk (FD), a CD-R, a DVD (Digital Versatile Disk) in a file of an installable format or an executable format.

In addition, the program to be executed in the radio tag reading apparatus 1 of the embodiments may be stored on a computer connected to a network such as Internet, and may be provided by being downloaded through the network. In addition, the program to be executed in the radio tag reading apparatus 1 of the embodiments may be may be provided or distributed via a network such as Internet.

In addition, the program to be executed in the radio tag reading apparatus 1 of the embodiments may be provided while being previously incorporated in a ROM or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radio tag reading apparatus for radiating a radio wave to a radio tag for receiving information from the radio tag, comprising:
    an antenna device which radiates a radio wave toward a radio tag and receives a response radio wave from the radio tag;
    a storage device which stores a first frequency band including all of the frequency bands in which the radio wave can be radiated and a plurality of second frequency bands obtained by sorting the first frequency band; and
    a processor configured to:
        when the first frequency band is not usable and at least one second frequency band out of the plurality of second frequency bands is usable, judge whether two or more consecutive second frequency bands out of the plurality of second frequency bands are usable, and
        make the antenna device radiate the radio wave within a judged usable frequency band at a transmission rate in accordance with a width of the judged usable frequency band to execute communication with the radio tag.

2. The radio tag reading apparatus according to claim 1, wherein the processor is configured to:
    judge whether or not the first frequency band is usable,
    when the first frequency band is judged not usable, judge whether or not any second frequency band is usable, and
    when the first frequency band is judged not usable, judge whether two or more consecutive second frequency bands out of the plurality of the second frequency bands are usable.

3. The radio tag reading apparatus according to claim 2, wherein when the first frequency band is judged usable, the processor is configured to make the antenna device radiate the radio wave in the first frequency band at a high speed first transmission rate.

4. The radio tag reading apparatus according to claim 3, wherein when the first frequency band is judged not usable and at least one second frequency band out of the plurality of second frequency bands is judged usable, the processor is configured to make the antenna device radiate the radio wave in the judged usable second frequency band at a second transmission rate slower than the first transmission rate.

5. The radio tag reading apparatus according to claim 1, wherein the processor is configured to:
    execute a first judgment to judge, respectively, whether or not each second frequency band in the plurality of second frequency bands is usable,
    execute a second judgment to judge whether or not all second frequency bands of the plurality of second frequency bands are usable based on a result of the first judgment, and
    when not all of the second frequency bands of the plurality of second frequency bands are judged usable based on a result of the second judgment, execute a third judgment to judge whether or not any of the second frequency bands out of the plurality of second frequency bands is usable.

6. The radio tag reading apparatus according to claim 5, wherein when all of the plurality of second frequency bands are usable, based on the result of the second judgment, the processor is configured to make the antenna device radiate the radio wave in the first frequency band at a high speed first transmission rate.

7. The radio tag reading apparatus according to claim 6, wherein when at least one second frequency band out of the plurality of second frequency bands is usable, based on the result of the third judgment, the processor is configured to make the antenna device radiate the radio wave in the at least one second frequency band at a second transmission rate slower than the first transmission rate.

8. The radio tag reading apparatus according to claim 6, wherein when the at least one second frequency band out of the plurality of second frequency bands is usable, based on the result of the third judgment, the processor is configured to execute a fourth judgment to judge whether or not two or more consecutive second frequency bands out of the plurality of second frequency bands are usable.

9. The radio tag reading apparatus according to claim 8, wherein when two or more consecutive second frequency bands are not usable, based on a result of the fourth judgment, the processor is configured to make the antenna device radiate the radio wave in only one judged usable second frequency band at a second transmission rate slower than the first transmission rate.

10. The radio tag reading apparatus according to claim 9, wherein when two or more consecutive second frequency bands are judged usable, based on the result of the fourth judgment, the processor is configured to make the antenna device radiate the radio wave in a frequency band including the two or more consecutive second frequency bands at a third transmission rate slower than the first transmission rate and faster than the second transmission rate.

* * * * *